(12) United States Patent
Thubert et al.

(10) Patent No.: US 9,596,180 B2
(45) Date of Patent: Mar. 14, 2017

(54) INSTALLATION OF CACHED DOWNWARD PATHS BASED ON UPWARD DATA TRAFFIC IN A NON-STORING LOW-POWER AND LOSSY NETWORK

(71) Applicant: Cisco Technology, Inc., San Jose, CA (US)

(72) Inventors: Pascal Thubert, La Colle sur Loup (FR); Jean-Philippe Vasseur, Saint Martin d'Uriage (FR); James Pylakutty Mundenmaney, Bangalore (IN); Patrick Wetterwald, Mouans Sartoux (FR)

(73) Assignee: Cisco Technology, Inc., San Jose, CA (US)

( * ) Notice: Subject to any disclaimer, the term of this patent is extended or adjusted under 35 U.S.C. 154(b) by 121 days.

(21) Appl. No.: 14/590,672

(22) Filed: Jan. 6, 2015

(65) Prior Publication Data

US 2016/0197829 A1  Jul. 7, 2016

(51) Int. Cl.
| | | |
|---|---|---|
| *H04L 12/28* | (2006.01) | |
| *H04L 12/741* | (2013.01) | |
| *H04L 12/813* | (2013.01) | |
| *H04L 12/747* | (2013.01) | |
| *H04L 12/751* | (2013.01) | |

(Continued)

(52) U.S. Cl.
CPC ............ *H04L 45/745* (2013.01); *H04L 45/00* (2013.01); *H04L 45/02* (2013.01); *H04L 45/742* (2013.01); *H04L 47/20* (2013.01); *H04L 67/12* (2013.01); *H04L 67/2842* (2013.01)

(58) Field of Classification Search
USPC .......... 370/229–255, 392–408; 709/220–238
See application file for complete search history.

(56) References Cited

U.S. PATENT DOCUMENTS

| 7,072,952 | B2 * | 7/2006 | Takehiro | ................ H04L 45/00 370/254 |
|---|---|---|---|---|
| 7,366,111 | B2 | 4/2008 | Thubert et al. | |
| 7,428,221 | B2 | 9/2008 | Thubert et al. | |

(Continued)

OTHER PUBLICATIONS

Cisco Systems, Inc, "Cisco Connected Grid WPAN Module for CGR 1000 Series Installation and CG-Mesh Configuration Guide", Apr. 2014 [retrieved on Aug. 27, 2014]. Retrieved from the Internet: <URL: http://www.cisco.com/c/en/us/td/docs/routers/connectedgrid/modules/wpanirelease_5-0/Cisco_Connected_Grid_WPAN_Module_for_CGR_1000_Series_installation_and_CG-Mesh_Configuration_Guide.pdf>, pp. 1-46.

(Continued)

*Primary Examiner* — Man Phan
(74) *Attorney, Agent, or Firm* — Leon R. Turkevich

(57) ABSTRACT

In one embodiment, a method comprises: receiving, by a parent network device in a directed acyclic graph (DAG) network topology, a data packet destined toward a DAG root and having been output by a target device in the network topology; identifying, by the parent network device based on the received data packet, an identifiable condition for caching a downward path enabling the parent network device to reach the target device independent of any route table entry in the parent network device; and caching, in the parent network device, the downward path enabling the parent network device to reach the target device independent of any route table entry in the parent network device.

20 Claims, 4 Drawing Sheets

(51) Int. Cl.
*H04L 12/701* (2013.01)
*H04L 29/08* (2006.01)

(56) References Cited

U.S. PATENT DOCUMENTS

| | | | | |
|---|---|---|---|---|
| 7,656,857 | B2 | 2/2010 | Thubert et al. | |
| 7,693,064 | B2 | 4/2010 | Thubert et al. | |
| 7,778,235 | B2 | 8/2010 | Thubert et al. | |
| 7,835,378 | B2* | 11/2010 | Wijnands | H04L 12/18 370/408 |
| 7,860,025 | B2 | 12/2010 | Thubert et al. | |
| 7,885,274 | B2 | 2/2011 | Thubert | |
| 8,270,313 | B2* | 9/2012 | Tao | H04L 45/18 370/252 |
| 8,489,765 | B2* | 7/2013 | Vasseur | H04L 45/48 709/238 |
| 8,593,986 | B2* | 11/2013 | Vasseur | H04L 45/34 370/216 |
| 8,630,177 | B2* | 1/2014 | Vasseur | H04L 45/34 370/229 |
| 8,724,516 | B2* | 5/2014 | Young | H04W 40/246 370/255 |
| 9,344,256 | B2* | 5/2016 | Thubert | H04L 5/0067 |
| 2009/0040945 | A1* | 2/2009 | Xhafa | H04W 72/1242 370/254 |
| 2011/0228788 | A1 | 9/2011 | Thubert et al. | |
| 2012/0307629 | A1 | 12/2012 | Vasseur et al. | |
| 2014/0029445 | A1 | 1/2014 | Hui et al. | |
| 2014/0126423 | A1 | 5/2014 | Vasseur et al. | |
| 2016/0072697 | A1* | 3/2016 | Thubert | H04L 45/025 370/254 |

OTHER PUBLICATIONS

Ko et al., "RPL Routing Pathology in a Network With a Mix of Nodes Operating in Storing and Non-Storing Modes", Feb. 12, 2014, [retrieved on Jul. 25, 2014]. Retrieved from the Internet: <URL: http://tools.ietf.org/pdf/draft-ko-roll-mix-network-pathology-04.pdf>, pp. 1-8.

Pei et al., "Fisheye State Routing: A Routing Scheme for Ad Hoc Wireless Networks", Proceedings of the IEEE International Conference on Communications, New Orleans, LA, Jun. 2000, [retrieved on May 5, 2006] Retrieved from the Internet: <citeseer.ist.psu.edu/article/pei00fisheye.html>, pp. 70-74 (5 pages).

Winter, Ed., "RPL: IPv6 Routing Protocol for Low-Power and Lossy Networks", Internet Engineering Task Force, Request for Comments: 6550, Mar. 2012, pp. 1-157.

Vasseur, Ed., "Routing Metrics Used for Path Calculation in Low-Power and Lossy Networks", Internet Engineering Task Force, Request for Comments: 6551, Mar. 2012, pp. 1-30.

Hui et al., "An IPv6 Routing Header for Source Routes with the Routing Protocol for Low-Power and Lossy Networks (RPL)", Internet Engineering Task Force, Request for Comments: 6554, Mar. 2012, pp. 1-13.

U.S. Appl. No. 14/482,571, filed Sep. 10, 2014.

Thubert, Ed., et al., "An Architecture for IPv6 over the TSCH mode of IEEE 802.15.4e", Oct. 27, 2014, [retrieved on Dec. 11, 2015]. Retrieved from the Internet: <URL: https://tools.ietf.org/html/draft-ietf-6tisch-architecture-04>, pp. 1-32.

Vasseur, "Terms Used in Routing for Low-Power and Lossy Networks" Internet Engineering Task Force, Request for comments: 7102, Jan. 2014, pp. 1-8.

* cited by examiner

INSTALLATION OF CACHED DOWNWARD PATHS BASED ON UPWARD DATA TRAFFIC IN A NON-STORING LOW-POWER AND LOSSY NETWORK

TECHNICAL FIELD

The present disclosure generally relates to routing data packets in non-storing mode Low-power and Lossy Networks (LLNs).

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

A Low-power and Lossy Network (LLN) is a network that can include dozens or thousands of low-power router devices configured for routing data packets according to a routing protocol designed for such low power and lossy networks (RPL): such low-power router devices can be referred to as "RPL nodes". Each RPL node in the LLN typically is constrained by processing power, memory, and energy (e.g., battery power); interconnecting links between the RPL nodes typically are constrained by high loss rates, low data rates, and instability with relatively low packet delivery rates. A network topology (a "RPL instance") can be established based on creating routes toward a single "root" network device in the form of a directed acyclic graph (DAG) toward the root network device, also referred to as a "DAG root", where all routes in the LLN terminate at the DAG root.

Downward routes (i.e., away from the DAG root) can be created based on Destination Advertisement Object (DAO) messages that are created by a RPL node and propagated toward the DAG root. The RPL instance implements downward routes in the DAG of the LLN in either a storing mode only (fully stateful), or a non-storing mode only (fully source routed by the DAG root). In storing mode, a RPL node unicasts its DAO message to its parent node, such that RPL nodes store downward routing tables for their "sub-DAG" (the "child" nodes connected to the RPL node). In non-storing mode the RPL nodes do not store downward routing tables, hence a RPL node unicasts its DAO message to the DAG root, such that all data packets are sent to the DAG root and routed downward with source routes inserted by the DAG root.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1:
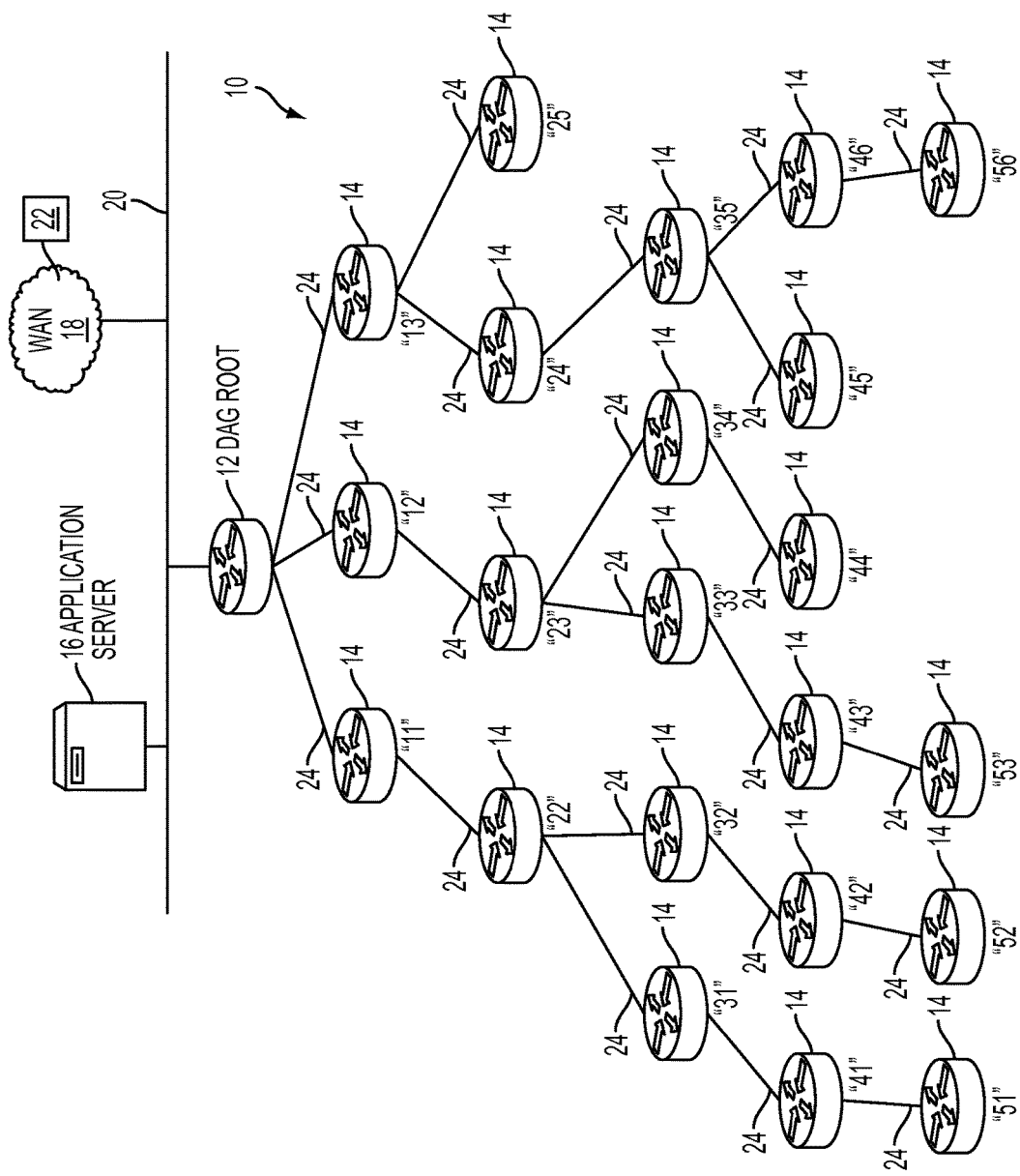
FIG. 1 illustrates an example network having a directed acyclic graph (DAG) root and one or more network devices configured for causing caching of a downward route entry for reaching a target device having output a data packet upward toward the DAG root, according to an example embodiment.

In one embodiment, a method comprises: receiving, by a parent network device in a directed acyclic graph (DAG) network topology, a data packet destined toward a DAG root and having been output by a target device in the network topology; identifying, by the parent network device based on the received data packet, an identifiable condition for caching a downward path enabling the parent network device to reach the target device independent of any route table entry in the parent network device; and caching, in the parent network device, the downward path enabling the parent network device to reach the target device independent of any route table entry in the parent network device.

In another embodiment, an apparatus comprises a device interface circuit, a processor circuit, and a memory circuit. The device interface circuit is configured for receiving, in a directed acyclic graph (DAG) network topology, a data packet destined toward a DAG root and having been output by a target device in the network topology, the apparatus distinct from the DAG root. The processor circuit is configured for identifying, based on the received data packet, an identifiable condition for caching a downward path enabling the apparatus to reach the target device independent of any route table entry in the apparatus. The memory circuit is configured for storing the downward path in response to caching thereof by the processor circuit, the cached downward path enabling the apparatus to reach the target device independent of any route table entry in the memory circuit.

In another embodiment, logic is encoded in one or more non-transitory tangible media for execution by a machine and when executed by the machine operable for: receiving, by the machine in a directed acyclic graph (DAG) network topology, a data packet destined toward a DAG root and having been output by a target device in the network topology; identifying, by the machine based on the received data packet, an identifiable condition for caching a downward path enabling the machine to reach the target device independent of any route table entry; and caching the downward path enabling the machine to reach the target device independent of any route table entry.

DETAILED DESCRIPTION

The Internet Engineering Task Force (IETF) has published a Request for Comments (RFC) 6550 entitled "IPv6 Routing Protocol for Low-Power and Lossy Networks", also referred to as "RPL". Particular embodiments enable any parent network device (i.e., any network device that is not a leaf node or a directed acyclic graph (DAG) root) operating in a non-storing mode (e.g., a RPL non-storing mode topology according to RFC 6550) to cause installation of a localized and temporary cached downward path for reaching a target device.

Example embodiments enable a RPL node having constrained resources and operating as a parent network device in a DAG network topology to cache a downward path for reaching a target network device (i.e., "target device"). Unlike existing routing protocols that assume that a route entry must be stored and maintained to enable reachability to any destination device at all times within a network topology (e.g., a device address or an IPv6 address prefix in a RPL topology), the example embodiments provide an opportunistic storing of reachability information in response to a target device having output a data packet destined toward a DAG root: the opportunistic storing enables a parent network device in the DAG network topology to cache (e.g., a transient caching on a temporary basis) a downward path that enables the parent network device to reach the target device independent of any route table entry in the parent network device.

According to the example embodiments, the caching (e.g., a transient caching on a temporary basis) of a downward path toward a target device is distinct from a route entry stored according to a routing protocol in that the cached downward path can be deleted, or "flushed", from the parent network device without loss of reachability to the target device. In particular, use of existing routing protocols rely on the assumption that network devices require persistent (i.e., constant) reachability in a data network. However, the thousands of low-power router devices and/or sensor devices (hereinafter "target devices") that might be deployed in a low-power and lossy network may only need to establish bidirectional communications periodically or sporadically for only a limited interval (e.g., only once a day for up to ten minutes), or only in response to a detected sensor value reaching or exceeding a prescribed value (e.g., a fire alarm sensor initiated in response to a detected temperature exceeding 190 degrees Fahrenheit); in other words, not all network devices need to establish bidirectional communications at the same time, but may only sporadically or periodically require bidirectional communications for only a limited interval.

Since all network devices many need not establish bidirectional communications at the same time in a low-power and lossy network, the opportunistic caching of a downward path (e.g., a transient caching on a temporary basis) can be based on recognizing that the bidirectional communication requirements for target devices can be distributed over time. Hence, if a lower-power and lossy network has five thousand sensor devices, where each sensor device requires only five minutes of bidirectional communications every twenty-four hours, then assuming an even distribution of a sensor device initiating a bidirectional communication with a destination device (e.g., the DAG root), then any given parent network device requires no more than a cache size for up to eighteen (18) cached downward routes for up to eighteen (18) target devices requiring bidirectional communications at any given point in time (5000 devices divided by 24 hours, divided by 12 devices per hour (i.e., 5 minutes per device)). Hence, the example transient caching of a limited number of cached downward routes enables a RPL node with constrained processing power, memory, and energy to optimize packet forwarding in the "forwarding plane," independent and distinct from the "control plane" of existing routing protocols.

Hence, caching of downward paths in the example embodiments provide an optimization to existing routing protocols in a DAG network topology, as data packets can be forwarded to a low-power router device and/or a sensor device (referred to generally as a "target device") using a cached downward path, independent and distinct from any route table entry or execution of any routing protocol. The cached downward path for reaching the target device can be stored by the parent network device in response to any received data packet from the target device, for example based on storing a cache entry specifying the target device (identifiable by a source IPv6 address in an IPv6 header in the received data packet) is reachable via a next-hop child (identifiable by a source IPv6 address in the outer IPv6 header in the received data packet).

Further, the cached downward path for a target device can be "flushed" once no longer needed, for example after a determined time interval, and/or after a determined number of data bytes have been transmitted to the target device; alternately, the cached downward path can be "flushed" on a first-in-first-out basis, for example if a constrained cache size in the RPL node requires the cached downward path to be overwritten by a newer downward path for another target device. The cached downward path also can be "flushed" in response to the RPL node operating as a parent network device determining that a next-hop child device no longer has a downward path for reaching the target device in order to prevent loop formation.

Hence, the example embodiments enable a scalable optimization of storing downward paths that eliminates the necessity of large source-route headers in non-storing mode networks, based on providing cached (e.g., temporary) downward paths that can be "flushed" or deleted without compromising reachability within the RPL network. The reliance on source-route headers in a non-storing network can be eliminated entirely if network traffic to a target device need only occur in response to a data packet transmission initiated by a target device, enabling the data packet size to be substantially reduced. Further, since a conventional RPL non-storing mode topology as specified in RFC 6550 would require each and every data packet to be transmitted to the DAG root, the caching of downward paths in common parents can dramatically reduce the network traffic encountered by the DAG root; moreover, the reduction of packet size by eliminating the necessity of strict source route headers in data packets greatly reduces processing requirements in forwarding the data packets and improves packet delivery rates.

FIG. 1 illustrates an example non-storing network topology 10 having a network device 12 operating as a DAG root for multiple network devices 14 operating as RPL nodes, according to an example embodiment. The DAG root 12 can serve as a "sink" for the RPL nodes 14, for example for reaching a server device 16 and/or a wide area network 18 via a backbone link 20. Each network device 14 in the network topology 10 can be configured for operating in non-storing mode. Hence, each RPL node 14 can unicast its DAO message to the DAG root 12 in accordance with RFC 6550. The DAG root 12, in response to receiving the DAO messages from the RPL nodes 14, can build the entire DAG topology and store the DAG topology in its memory circuit 44 (illustrated in FIG. 2), including storage of heuristics of usage, path length, knowledge of device capacity, link reliability, etc.

As described in further detail below with respect to FIGS. 3A, 3B, and 3C, each RPL node 14 that operates as a parent network device (e.g., "22" of FIG. 1) for an attached "child" RPL node (e.g., "31") 14 can internally cache a downward path for reaching a target device (e.g., "51") via the attached RPL node ("31"), in response to detecting a cacheable condition. For example, in response to a parent network device "41" receiving a data packet originated by its child network device "51" 14, the parent network device "41" can cache a downward path (i.e., away from the DAG root 12) that the target device "51" 14 is reachable via a given egress interface on the parent device "41" (e.g., output to an IPv6 address "41::51" that is the attachment address of the target device "51"); the next parent network device "31", in response to receiving the data packet from its child RPL node "41", can cache the downward path that the target device "51" 14 is reachable via the child RPL node "41"; the next parent network device "22", in response to receiving the data packet from its child RPL node "31", can cache the downward path that the target device "51" 14 is reachable via the child RPL node "31"; and the next parent network device "11", in response to receiving the data packet from its child RPL node "22", can cache the downward path that the target device "51" 14 is reachable via the child RPL node "22".

Hence, each of the parent network devices "41", "31", "22", and "11" 14 can execute a caching (e.g., a transient caching on a temporary basis) of a downward path (i.e., away from the DAG root 12) for reaching the target network device "51" 14, independent of any route table entry in the parent network device; moreover, a common parent device (e.g., "22") 14 can cache downward paths toward multiple "target devices" (e.g., network devices "51" and "52") within its sub-DAG, such that a data packet originated by one RPL node "51" and destined toward another RPL node "52" can be forwarded by the common parent device (e.g., "22") to the corresponding parent device "32" of the destination target "52" eliminating the necessity that the data packet be forwarded via the default route toward the DAG root 12.

Figure 2:
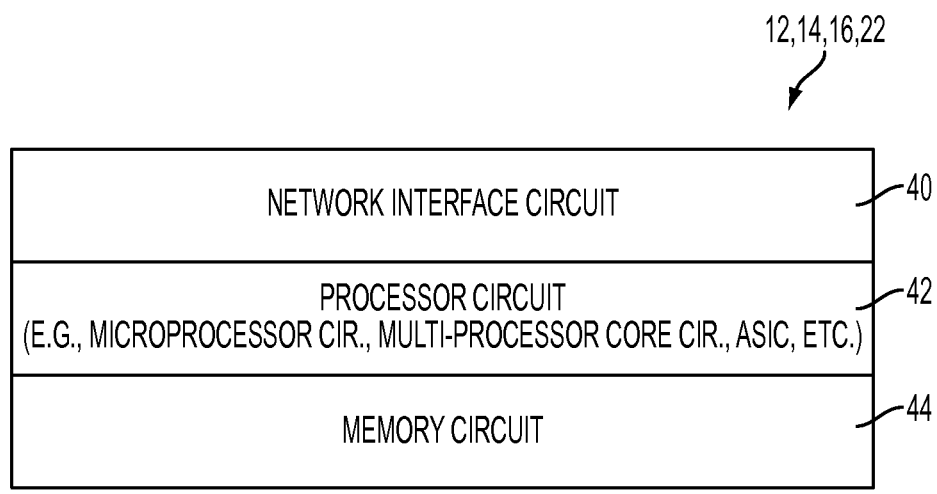
FIG. 2 illustrates an example implementation of any one of the network devices of FIG. 1, including the DAG root, according to an example embodiment.

FIG. 2 illustrates an example implementation of any one of the DAG root 12, an RPL node 14, the server device 16, and/or the network device 22 of FIG. 1, according to an example embodiment. Each apparatus 12, 14, 16, and/or 22 is a physical machine (i.e., a hardware device) configured for implementing network communications with other physical machines via the network 10 and/or 18. The term "configured for" or "configured to" as used herein with respect to a specified operation refers to a device and/or machine that is physically constructed and arranged to perform the specified operation.

Each apparatus 12, 14, 16, and/or 22 can include a device interface circuit 40, a processor circuit 42, and a memory circuit 44. The device interface circuit 40 can include one or more distinct physical layer transceivers for communication with any one of the other devices 12, 14, 16, and/or 22; the device interface circuit 40 also can include an IEEE based Ethernet transceiver for communications with the devices of FIG. 1 via any of the wireless links 24 or wired link 20. The processor circuit 42 can be configured for executing any of the operations described herein, and the memory circuit 44 can be configured for storing any data as described herein, for example route entries, data packets, executable code, etc.

Any of the disclosed circuits of the devices 12, 14, 16, and/or 22 (including the device interface circuit 40, the processor circuit 42, the memory circuit 44, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 44) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 44 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 44 can be implemented dynamically by the processor circuit 42, for example based on memory address assignment and partitioning executed by the processor circuit 42.

Figure 3A:
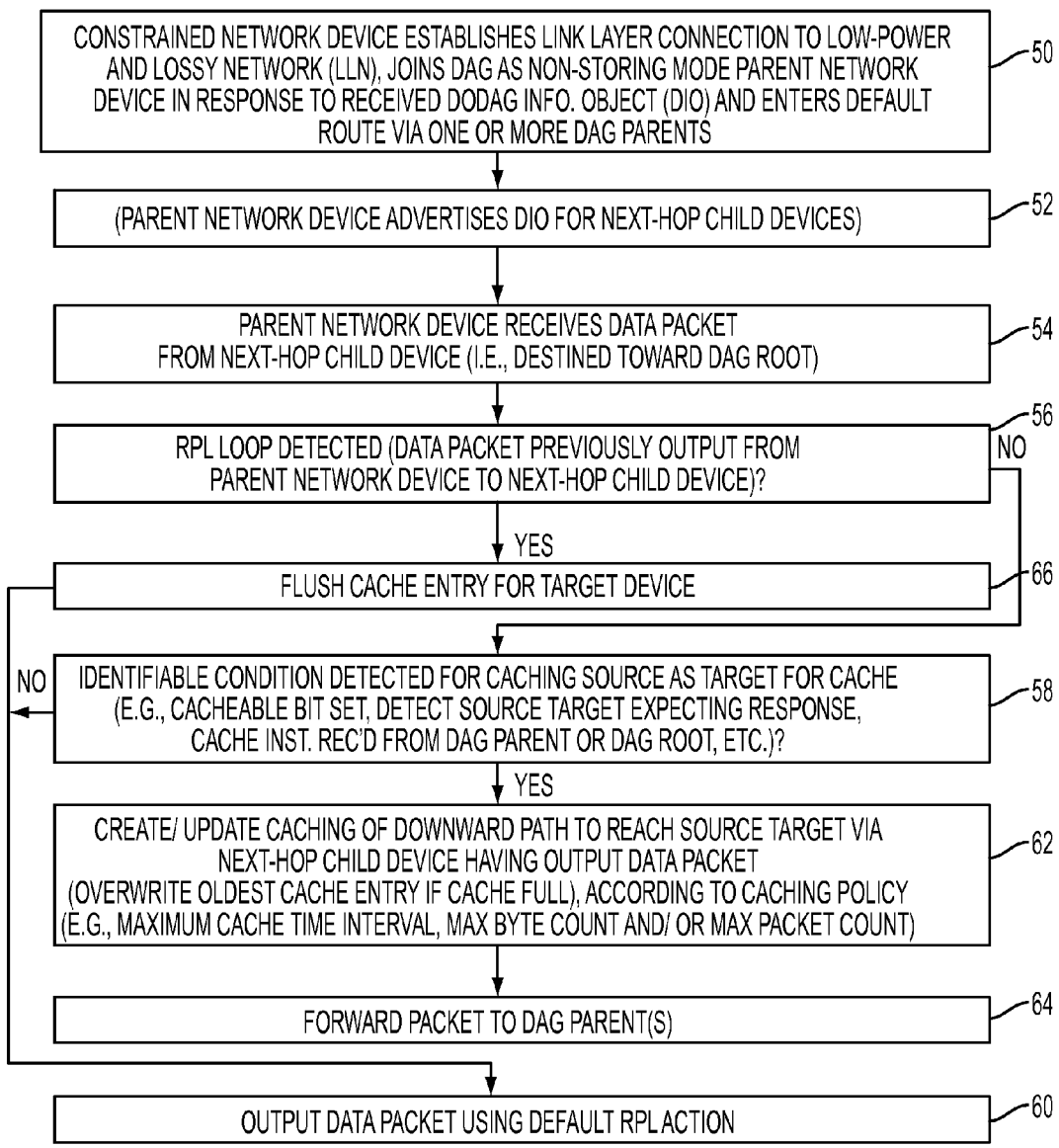
FIGS. 3A, 3B, and 3C illustrate an example method of causing caching of a downward route entry in one or more network devices for reaching a target device, according to an example embodiment.
Figures 3B, 3C:
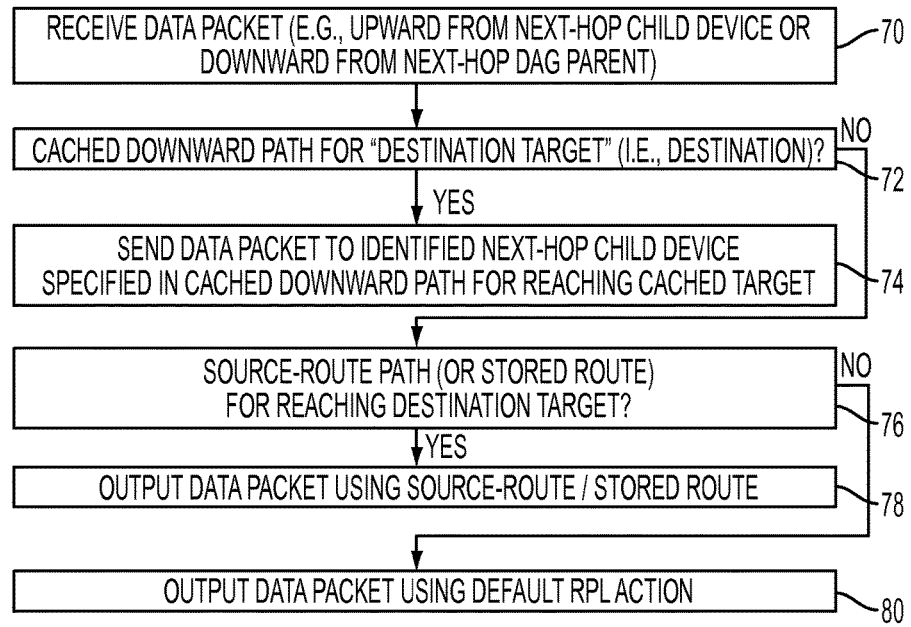

FIGS. 3A, 3B, and 3C illustrate an example method of causing caching of a downward route entry in one or more network devices for reaching a target device, according to an example embodiment. The operations described with respect to any of the Figures can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

In addition, the operations described with respect to any of the Figures can be performed in any suitable order, or at least some of the operations in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or at least some of the operations in parallel.

Referring to operation 50, each constrained network device 14 in the network topology 10 can establish a link layer connection to other network devices 14 within the constrained network 10, and join the DAG as a non-storing mode network device in response to a received destination oriented directed a cyclic graph (DODAG) information object (DIO) advertised by the DAG root 12, for example according to RFC 6550. As part of joining a DAG topology 10, the processor circuit 42 of each network device 14 can create a default route entry in its corresponding memory circuit 44 for reaching the DAG root 12 via one or more attachment addresses used to attach to one or more parent network devices. For example, the network device "22" 14, having attached to the network device "11" 14 via a default attachment IPv6 address "11::22", can create a default route table entry that all default data traffic toward the DAG root 12 should be output using its corresponding network interface circuit 40 via the default ingress interface "11::12". The convention as used herein for illustration of attachment addresses is that the parent network device advertises its address prefix based on its node identifier (e.g., network device "11" advertises the IPv6 address prefix "11::/96"), and the attaching child network device uses its node identifier as a suffix for its attachment address (e.g., network device "22" attaches to network device "11" using the attachment address "11::22").

The processor circuit 42 of each network device 14 can respond to attaching to a parent network device by advertising its own corresponding DIO messages in operation 52, enabling other next hop child devices to attach to the network device for reaching the DAG root 12. The processor circuit 42 of each network device 14 also can respond to attaching to a parent network device 14 by generating and outputting a DAO message that is propagated toward the DAG root 12: unlike storing mode in RFC 6550, the example embodiments assume that the parent network devices 14 operate in a non-storing mode and do not store any routing information received via a next hop child device according to a routing protocol such as RPL. Rather, the example embodiments enabling caching of downward paths, described below.

The network interface circuit 40 of a parent network device (e.g., "22" of FIG. 1) 14 can receive in operation 54 a data packet from a next hop child device (e.g., "31") that is destined for the DAG root 12 (i.e., the data packet is transmitted in the "upward direction" from the next hop child device "31" to its parent device "11"). Assuming a RPL loop is not detected in operation 56 (described below), the processor circuit 42 of the parent network device (e.g., "22" identifies in operation 58 whether an identifiable condition is detected for caching the source of the data packet as a target for caching a downward path toward the target. Example identifiable conditions include the processor circuit 42 of the parent network device "22" detecting a "cacheable" bit flag set in the received data packet, the processor circuit 42 detecting that a response is expected by the source device (e.g., based on detecting a prescribed sensor type or deep-packet inspection indicating the source of the data packet is expecting an acknowledgement, etc.), an instruction received from a DAG parents or the DAG root 12 to cache a data packet received from the identified source, etc. If in operation 58 the identifiable condition is not detected by the processor circuit 42, then the processor circuit 42 of the parent network device "22" in operation 60 outputs the data packet using its default RPL route entry stored in its memory circuit 44 toward the DAG root 12.

If, however, the processor circuit 42 of the parent network device "22" in operation 58 identifies the identifiable condition for caching the downward path, the processor circuit 42 in operation 62 creates (or updates) in its memory circuit 44 the caching of a downward path to reach the source target, having originated the data packet, via the next-hop child device (e.g., "31") having output the data packet. For example, assuming that the data packet was originated by the target device "51" (and assuming that the network devices "41" and "31" already have cached corresponding downward paths in their respective memory circuit 44 for reaching the source target "51"), the processor circuit 42 of the parent network device "22" can create a cached downward path in its memory circuit 44 specifying that the source target device "51" 14 is reachable via the next hop child device "31"; as apparent from the foregoing, the next hop child device "31" already will have created its own corresponding cached downward path to reach the source target device "51" 14 via its next hop child device "41", and the child device "41" already will have created its own corresponding cached downward path to reach the source target device "51" via the attachment address "41::51".

The caching of the downward route in operation 62 by the processor circuit 42 is executed according to a caching policy, for example based on a maximum cache time interval, a maximum byte count, and/or a maximum packet count. For example, the processor circuit 42 can overwrite a prior cached downward path (e.g., the oldest cache entry) with the new downward path if the cache size is full in the memory circuit 44. As illustrated in FIG. 3C, the caching policy can be a prescribed value or a dynamically-determined value based on heuristics calculated by the parent network device, the DAG root 12, or a management agent, 16). For example, the parent network device (e.g., "22") 14 can receive the prescribed caching policy in the form of cache management information in a data packet that is unicast to the target network device (e.g., "51") from the DAG root 12 or a management agent 16 (the DAG root 12 can transmit the data packet using source routing to the target network device if the parent network devices along the downward path have not yet cached the downward path information for reaching the target network device); hence, the cache management information can be supplied within a DIO message source routed from the DAG root 12 to the target network device (e.g., "51"). The parent network device (e.g., "22") 14 also can receive the prescribed caching policy from the target network device (e.g., "51") 14, for example within the received data packet: if the received data packet is a DAO message that also includes the cache management information, the processor circuit 42 can apply the cache management information and disregard the routing information specified in the DAO message, since the processor circuit 42 of the parent network device (e.g., "22") can recognize that the parent network device (e.g., "22") operates in non-storing mode. Alternatively, if operating in mixed mode the processor circuit 42 of the parent network device (e.g., "22") can respond to the DAO message by deleting (i.e., "flushing") the cached downward path and creating a DAO state in a RPL route table in its corresponding memory circuit 44.

Following the creating or updating of the cached downward path in operation 62 of FIG. 3A in response to receiving the data packet and identifying the identifiable condition for caching, the processor circuit 42 of the parent network device (e.g., "22") in operation 64 can forward the data packet (via its network interface circuit 40) to its DAG parent (e.g., "11"), enabling its DAG parent "11" to perform its own caching of the downward path prior to delivery of the data packet to the DAG root 12.

Hence, each parent network device "11", "22", "31", and "41" can cache its own corresponding downward path for reaching the target device "51" based solely on the cached downward paths operating in the forwarding plane, independent and distinct from any route table entry in any of the parent devices, and independent and distinct from any routing protocol such as RPL. Hence, the DAG root 12 can output a data packet to its next-hop child device "11" that is destined for the target device "51", without the necessity of any routing information such as a source route header in the data packet, or any route table entry in any of the parent network devices "11", "22", "31", and "41".

Referring to operations 64, 54, 56 and 66 of FIG. 3A, the processor circuit 42 of a parent network device (e.g., "22") can flush a cache entry for a target device (e.g., "51") in response to detecting a loop, for example in the case where the next hop child device (e.g., "31") has "flushed"/deleted its corresponding cache entry for reaching the target device (e.g., "51"). For example, the next hop child device "31" may flush its corresponding cache entry if it is nearing the "lifetime" set by the maximum cache time interval, or if the corresponding cache entry was overwritten as being the oldest cache entry if the corresponding memory cache was full (as in operation 62). In this case, the next hop child device "31" would output the data packet using its default RPL route entry (operation 60) in response to a determined absence of any cached downward route.

Hence, in response to the processor circuit 42 of the parent network device "22" detecting in operation 56 formation of a loop of the data packet transmitted to the next hop child device "31" (and returned back to the parent network device "22" using the default route of the next hop child device "31"), the processor circuit 42 of the parent network device "22" in operation 66 can flush the cache entry for the target network device "51" 14, and output the data packet using the default route entry in operation 60 for the RPL instance toward the DAG root. The flushing of the cached downward path can be repeated by the remaining parent network device(s) (e.g., 11") until reaching the DAG root device 12, at which point the DAG root device 12 can use source routing to for the data packet to the target destination device "51" 14.

FIG. 3B illustrates an example forwarding of the received data packet using cached downward paths, according to an example embodiment. Assume in operation 70 that the network interface circuit 40 of a parent network device (e.g., "22") receives a data packet destined for a "destination target" (e.g., "51") identified in the destination address field of the IPv6 header. The data packet can be received either upward from a next hop child device (e.g., "32") 14 or downward from a next hop DAG parent (e.g., "11"). The processor circuit 42 of the parent network device (e.g., "22") in operation 72 determines whether there is a cached downward path for the destination target (e.g., "51"), and sends the data packet to the identified next hop child device (e.g., "31") in operation 74 in response to detecting the cached downward path for reaching the cached target "51".

As described previously, the cached downward path enables the parent network device (e.g., "22") to reach the target device "51" independent of any route table entry in the parent network device, and without the necessity of any source route header in the received data packet; moreover, if the parent network device (e.g., "22") is a common parent (e.g., between the source device "52" and the target destination device "51") the cached downward path enables the parent network device (e.g., "22") to bypass its parent network device "11" and the DAG root 12 by directly sending the received data packet (received from the child network device "32") to the next-hop child "31".

If in operation 72 the processor circuit 42 of the parent network device (e.g., "22") determines that there is no cached downward path for reaching the destination target, the parent network device (e.g., "22") still can program data packets according to existing routing protocols such as RPL. For example, if in operation 76 the processor circuit 42 of the parent network device (e.g., "22") is able to access routing information (a source route path or a stored route for reaching the destination target), the processor circuit 42 of the parent network device (e.g., "22") in operation 78 can output the data packet to its next hop child device "31" using the routing information. If in operation 76 no routing information is available, the processor circuit of the parent network device (e.g., "22") can forward the data packet in operation 80 to its parent network device (e.g., "11") based on accessing its default route entry in executing its default action according to RPL protocol (as in operation 60 of FIG. 3A).

According to an example embodiments, downward paths for reaching a target device can be temporarily cached, enabling constrained RPL nodes (having limited processing power, memory, and/or energy resources) to optimize forwarding data packets solely within the forwarding plane, without the necessity of routing information maintained in the control plane according to a prescribed routing protocol. Moreover, the cached downward paths can be deleted, as appropriate, based on the limited memory or power constraints of the RPL nodes.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
receiving, by a parent network device in a directed acyclic graph (DAG) network topology, a data packet destined toward a DAG root and having been output by a target device in the network topology;
identifying, by the parent network device based on the received data packet, an identifiable condition for caching a downward path enabling the parent network device to reach the target device independent of any route table entry in the parent network device; and
caching, in the parent network device, the downward path enabling the parent network device to reach the target device independent of any route table entry in the parent network device, wherein the downward path is cached as a downward route entry according to a prescribed caching policy independent and distinct from any route table entry in the parent network device or any routing protocol.

2. The method of claim 1, wherein the identifying includes detecting the identifiable condition based on one or more of detecting a cacheable flag in the received data packet, or determining the target device is expected to receive a response to the data packet.

3. The method of claim 1, wherein the prescribed caching policy includes caching the downward path for at least one or more of a maximum cache time interval, a maximum byte count, or a maximum number of downward data packets.

4. The method of claim 1, wherein the prescribed caching policy is received from the DAG root, the prescribed caching policy based on network traffic between the target device and the DAG root.

5. The method of claim 1, wherein the caching includes overwriting a prior cached downward path with the downward path to reach the target device, based on a prescribed cache size in the parent network device.

6. The method of claim 1, wherein the downward path specifies a next-hop child device in the DAG network topology for reaching the target device.

7. The method of claim 6, further comprising:
sending a received data packet destined for the target device to the next-hop child device based on the cached downward path;
detecting reception of the data packet destined for the target device from the next-hop child device; and
flushing the cached downward path in response to detecting the reception of the data packet destined for the target device.

8. An apparatus comprising:
a device interface circuit configured for receiving, in a directed acyclic graph (DAG) network topology, a data packet destined toward a DAG root and having been output by a target device in the network topology, the apparatus distinct from the DAG root;
a processor circuit configured for identifying, based on the received data packet, an identifiable condition for caching a downward path enabling the apparatus to reach the target device independent of any route table entry in the apparatus; and
a memory circuit configured for storing the downward path in response to caching thereof by the processor circuit, the cached downward path enabling the apparatus to reach the target device independent of any route table entry in the memory circuit;
wherein the downward path is cached by the processor circuit as a downward route entry according to a prescribed caching policy independent and distinct from any route table entry in the apparatus or any routing protocol.

9. The apparatus of claim 8, wherein the processor circuit is configured identifying the identifiable condition based on one or more of detecting a cacheable flag in the received data packet, or determining the target device is expected to receive a response to the data packet.

10. The apparatus of claim 8, wherein the prescribed caching policy includes caching the downward path for at least one or more of a maximum cache time interval, a maximum byte count, or a maximum number of downward data packets.

11. The apparatus of claim 8, wherein the prescribed caching policy is received from the DAG root, the prescribed caching policy based on network traffic between the target device and the DAG root.

12. The apparatus of claim 8, wherein the processor circuit is configured for caching the downward path based on overwriting a prior cached downward path in the memory circuit with the downward path to reach the target device, based on a prescribed cache size in the memory circuit.

13. The apparatus of claim 8, wherein the downward path specifies a next-hop child device in the DAG network topology for reaching the target device.

14. Logic encoded in one or more non-transitory tangible media for execution by a machine and when executed by the machine operable for:
receiving, by the machine in a directed acyclic graph (DAG) network topology, a data packet destined toward a DAG root and having been output by a target device in the network topology;
identifying, by the machine based on the received data packet, an identifiable condition for caching a downward path enabling the machine to reach the target device independent of any route table entry; and
caching the downward path enabling the machine to reach the target device independent of any route table entry, wherein the downward path is cached as a downward route entry according to a prescribed caching policy independent and distinct from any route table entry or any routing protocol.

15. The logic of claim 14, wherein the identifying includes detecting the identifiable condition based on one or more of detecting a cacheable flag in the received data packet, or determining the target device is expected to receive a response to the data packet.

16. The logic of claim 14, wherein the caching includes overwriting a prior cached downward path with the downward path to reach the target device, based on a prescribed cache size in the machine.

17. The logic of claim 14, wherein the downward path specifies a next-hop child device in the DAG network topology for reaching the target device, the logic when executed by the machine further operable for:
sending a received data packet destined for the target device to the next-hop child device based on the cached downward path;
detecting reception of the data packet destined for the target device from the next-hop child device; and
flushing the cached downward path in response to detecting the reception of the data packet destined for the target device.

18. The apparatus of claim 13, wherein the processor circuit is further configured for:
sending a received data packet destined for the target device to the next-hop child device based on the cached downward path;
detecting reception of the data packet destined for the target device from the next-hop child device; and
flushing the cached downward path from the memory circuit in response to detecting the reception of the data packet destined for the target device.

19. The logic of claim 14, wherein the prescribed caching policy includes caching the downward path for at least one or more of a maximum cache time interval, a maximum byte count, or a maximum number of downward data packets.

20. The logic of claim 14, wherein the prescribed caching policy is received from the DAG root, the prescribed caching policy based on network traffic between the target device and the DAG root.

* * * * *